US009467864B2

(12) United States Patent
Bai et al.

(10) Patent No.: US 9,467,864 B2
(45) Date of Patent: Oct. 11, 2016

(54) METHOD AND APPARATUS OF SPECTRUM UTILIZATION IN A WIRELESS CELLULAR ENVIRONMENT

(75) Inventors: Yong Bai, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 1121 days.

(21) Appl. No.: 12/609,747

(22) Filed: Oct. 30, 2009

(65) Prior Publication Data

US 2010/0113060 A1 May 6, 2010

(30) Foreign Application Priority Data

Oct. 30, 2008 (CN) ........................ 2008 1 0173623

(51) Int. Cl.
*H04W 16/14* (2009.01)
(52) U.S. Cl.
CPC .................................... *H04W 16/14* (2013.01)
(58) Field of Classification Search
CPC ........... H04W 16/14; H04W 72/0453; H04W 72/085; H04W 84/12; H04W 88/06; H04W 72/082; H04W 28/0231; H04B 17/0042
USPC ..................... 455/63.1, 63.2, 450, 453, 509
See application file for complete search history.

(56) References Cited

U.S. PATENT DOCUMENTS

| 2005/0148368 | A1* | 7/2005 | Scheinert et al. ............ 455/561 |
| 2008/0186842 | A1 | 8/2008 | Chong et al. |

FOREIGN PATENT DOCUMENTS

| WO | WO 2010011166 A1 * | 1/2010 | ............ H04W 16/14 |
| WO | WO 2010/043270 A1 * | 4/2010 | ............ H04W 16/14 |

OTHER PUBLICATIONS

Buddhikot (Understanding Dynamic Spectrum Access: Models, Taxonomy and Challenges, IEEE, pp. 649-663, 2007).*
Buddhikot, Milind M, "Understanding Dynamic Spectrum Access: Models, Taxonomy and Challenges," 2nd IEEE Symposium on New Frontiers in Dynamic Spectrum Access Networks, Apr. 2007, 16 pages.

(Continued)

*Primary Examiner* — George Eng
*Assistant Examiner* — Jing Gao
(74) *Attorney, Agent, or Firm* — Blakely, Sokoloff, Taylor & Zafman LLP

(57) ABSTRACT

The present invention discloses a method of spectrum utilization in a wireless cellular environment with coverage of at least two wireless networks and a related apparatus. The method includes: determining a RSRP threshold; detecting, by a small-cell base station, RSRPs of at least one large-cell base station; and comparing the highest one of the detected RSRPs with the determined RSRP threshold, adopting a separate spectrum mode if the highest one of the detected RSRPs exceeds the determined RSRP threshold, and otherwise, adopting a shared spectrum mode. According to the method and apparatus of the present invention, a separate spectrum mode is adopted when the small-cell base station is relatively close to the large-cell base station to decrease interferences between the small-cell base station and large-cell base station and to increase spectrum usage efficiency in the wireless cellular environment with coverage of at least two wireless networks, however, a shared spectrum mode is adopted when the small-cell base station is relatively far from to the large-cell base station to realize sharing spectrum and increase spectrum usage efficiency in the wireless cellular environment with coverage of at least two wireless networks.

10 Claims, 7 Drawing Sheets

(56) References Cited

OTHER PUBLICATIONS

Chaporkar, Prasanna, et al, "Throughput and Fairness Guarantees Through Maximal Scheduling in Wireless Networks," IEEE Transactions on Information Theory, vol. 54, No. 2, Feb. 2008, 23 pages.
European Patent Application No. 09012877.8, Extended European Search Report, Dated Mar. 10, 2010, 9 pages.
European Patent Application No. 09012877.8, First Office Action, Dated Nov. 3, 2011, 4 pages.
European Patent Application No. 09012877.8, Second Office Action, Dated Feb. 20, 2012, 4 pages.
Lee, Won-Yeol, et al, "Joint Spectrum and Power Allocation for Inter-Cell Spectrum Sharing in Cognitive Radio Networks," 3$^{rd}$ IEEE Symposium on New Frontiers in Dynamic Spectrum Access Networks, Oct. 2008, 12 pages.
Translation of first Chinese Office Action mailed Apr. 23, 2013 for Chinese Application No. 200810173623.3, 7 pages.
Translation of second Chinese Office Action mailed Sep. 21, 2013 for Chinese Application No. 200810173623.3, 7 pages.
Translation of Chinese Rejection mailed Feb. 21, 2014 for Chinese Application No. 200810173623.3, 8 pages.
Translation of first Japanese Rejection mailed Apr. 8, 2013 for Japanese Application No. 2009-246563, 3 pages.
Translation of second Japanese Rejection mailed Jul. 3, 2013 for Japanese Application No. 2009-246563, 2 pages.

* cited by examiner

METHOD AND APPARATUS OF SPECTRUM UTILIZATION IN A WIRELESS CELLULAR ENVIRONMENT

PRIORITY

The present application claims priority to and incorporates by reference the entire contents of Chinese patent application, No. 200810173623.3, filed in China on Oct. 30, 2008.

FIELD OF THE INVENTION

Embodiments of the present invention relates to wireless communication technology, and particularly to a method of spectrum utilization in a wireless cellular environment and a related apparatus.

BACKGROUND OF THE INVENTION

The wireless cellular network provides mobile users with communication services such as voice, data and etc by utilizing a network structure of cells. Normally, a cell provides a wireless transmission coverage in a certain area. Wherein, a Macrocell is of a largest wireless transmission radius, and multiple Macrocells may realize seamless wireless transmission coverage in a large area. A base station supporting the Macrocell is called a Macrocell base station, the transmission power of which is relatively high and the antenna of which is established at a relatively high place, e.g., the base station in a 3GPP network, namely Node B, or the base station in a 3GPP LTE (3GPP Long Term Evolution) network, namely eNode B (eNB), or etc.

In order to enlarge the capacity of the wireless cellular network and improve the quality of the wireless communication services in the coverage area of the wireless cellular network, wireless cells which have a wireless transmission radius smaller than that of the Macrocell may be adopted in hotspot areas and in doors, e.g., Microcells, Picocells, Femtocells and etc. Normally, compared with the base station supporting the Macrocell, the base stations that support these wireless cells having a wireless transmission radius smaller than the Macrocell's have a lower transmission power, and their antennas are established at a lower place.

Usually, the aforementioned wireless cells having different transmission radii may exist in some areas simultaneously, and in this case, the base stations of the wireless cells having different transmission radii provide overlapping coverage of at least two wireless networks within the overlapped coverage areas of these base stations. That is to say, the wireless cell having a larger transmission radius, e.g., the Macrocell, provides coverage of one wireless network, and the wireless cell having a smaller transmission radius, e.g., the Microcell, provides coverage of another wireless network.

In an area with coverage of at least two wireless networks, a User Equipment (UE) of a mobile user may select to access a large-cell network or a small-cell network. For example, in the 3GPP network, a Node B supports Macrocell coverage while an HNB supports Femtocell coverage, and a UE may select to access the Node B or the HNB in the overlapping area with coverage of the Node B and the HNB. For another example, in the 3GPP LTE network, an eNB supports Macrocell coverage while an HeNB supports Femtocell coverage, and the UE may select to access the eNB or the HeNB in the overlapped area with coverage of the eNB's and the HeNB. In the present invention, for convenience of description, the UE accessing the large-cell base station is called a large-cell UE while the one accessing the small-cell base station is called a Home UE (HUE).

In the aforementioned communication environment with coverage of at least two wireless networks, the two wireless networks may adopt a same spectrum or different spectrums. For example, if an available spectrum bandwidth for the two wireless networks is 20 MHz, both the large-cell network and the small-cell network can use this spectrum resource of 20 MHz when the two wireless networks adopt the same spectrum, or the available spectrum bandwidth can be divided into several parts which can be allocated to the two wireless networks when the two wireless networks adopt different spectrums, i.e., the large-cell network can use a part of the spectrum resource, e.g., 15 MHz, and the small-cell network can use the left part of the spectrum resource, e.g., 5 MHz.

There exists a co-channel interference between the two wireless networks when the large-cell network and the small-cell network adopts the same spectrum, or there exists a different-channel interference between the two wireless networks when the large-cell network and the small-cell network adopts different spectrums, or there exists an adjacent-channel interference between the two wireless networks when the large-cell network and the small-cell network adopts adjacent different spectrums. And usually, the shared-channel interference is much higher than the adjacent-channel interference or other different-channel interference. And thus, there are four kinds of uplink and downlink interference between the two wireless networks in a Frequency Division Duplex (FDD) system, including: the downlink interference from the large-cell base station to the HUE, the downlink interference from the small-cell base station to the large-cell UE, the uplink interference from the HUE to the large-cell base station and the uplink interference from the large-cell UE to the small-cell base station. By sharing the same spectrum between the two wireless networks, each wireless network can have more available spectrum resources, however, it will make greater shared-channel interference arose between the two wireless networks, which, in contrast, will decrease network capacity of the wireless networks. On the other hand, there exists a less different-channel interference between the two wireless networks when different spectrums are adopted therein while it makes each wireless network have less available spectrum resources. It can be seen based on the analysis that both higher interference and less available spectrum resources will decrease the network capacity of the wireless network and utilization efficiency of the spectrum in an environment with coverage of two wireless networks is thus relatively low.

SUMMARY OF THE INVENTION

To solve the aforementioned technical problem, embodiments of the present invention include a method of spectrum utilization in a wireless cellular environment and an apparatus thereof in order to improve utilization efficiency of the spectrum in the wireless cellular environment with coverage of at least two wireless networks.

The method of spectrum utilization in a wireless cellular environment with coverage of at least two wireless networks in accordance with an embodiment of the present invention includes: determining a reference signal received power (RSRP) threshold; detecting, by a small-cell base station, RSRPs of at least one large-cell base station; and comparing the highest one of the detected RSRPs with the determined RSRP threshold, adopting a separate spectrum mode if the highest one of the detected RSRP exceeds the determined RSRP threshold, and otherwise, adopting a shared spectrum mode.

In the above process, the RSRP threshold is a downlink RSRP threshold; and determining the RSRP threshold includes: determining whether service load information of the large-cell base station can be acquired, determining the downlink RSRP threshold according to acquired service load information of the large-cell base station if the service load information of the large-cell base station can be acquired, and designating a pre-configured value as the downlink RSRP threshold if the service load information of the large-cell base station can not be acquired.

In one embodiment, determining the downlink RSRP threshold according to the acquired service load information of the large-cell base station includes: determining relationships between large-cell downlink data throughput and the RSRP in the shared spectrum mode and the separate spectrum mode respectively according to the acquired service load information of the large-cell base station; calculating the RSRP when the large-cell downlink data throughput in the shared spectrum mode is equal to that in the separate spectrum mode; and using the calculated RSRP as the downlink RSRP threshold.

In one embodiment, the per-configured value is the RSRP of the large-cell base station detected by the small-cell base station when the large-cell base station has a full load and network capacity of the small-cell base station in the shared spectrum mode is equal to that in separate spectrum mode.

In addition, the RSRP threshold can also be an uplink RSRP threshold; and determining the RSRP threshold includes: determining a threshold of a total acceptable uplink interference of a large-cell base station; detecting a current uplink interference to the large-cell base station; determining an acceptable small-cell interference threshold according to the threshold of the total acceptable uplink interference of the large-cell base station and the current uplink interference; and determining the uplink RSRP threshold according to the acceptable small-cell interference threshold.

In one embodiment, the threshold of the total acceptable interference of the large-cell base station is a total uplink interference suffered by the large-cell base station in the shared spectrum mode when the network capacity of the large-cell base station in the shared spectrum mode is equal to that in the separate spectrum mode.

In one embodiment, determining an acceptable small-cell interference threshold according to the threshold of the total acceptable uplink interference of the large-cell base station and the current uplink interference includes: deducting the current uplink interference to the large-cell base station from the threshold of the total acceptable uplink interference of the large-cell base station; and using the difference as the acceptable small-cell interference threshold.

In one embodiment, the method further includes: determining the uplink RSRP threshold according to service load information of the large-cell base station if the service load information of the large-cell base station can be acquired.

In one embodiment, the determining the uplink RSRP threshold according to service load information of the large-cell base station includes: determining relationships between large-cell downlink data throughput and the RSRP in the shared spectrum mode and the separate spectrum mode respectively according to the acquired service load information of the large-cell base station; calculating the RSRP when the large-cell uplink data throughput in the shared spectrum mode is equal to that in the separate spectrum mode; and using the calculated RSRP as the uplink RSRP threshold.

A method of spectrum utilization in a wireless cellular environment with coverage of at least two wireless networks according to another embodiment of the present invention includes: determining a distance threshold, the distance threshold being a distance division point for changing a small-cell base station's spectrum using mode, and the spectrum using mode comprising a shared spectrum mode and a separate spectrum mode; detecting a distance between the small-cell base station and the closest large-cell base station; and comparing the detected distance and the determined distance threshold, adopting the shared spectrum mode if the detected distance exceeds the determined distance threshold, and otherwise, adopting the separate spectrum mode.

An apparatus for determining a spectrum using mode in accordance with an embodiment of the present invention includes: a RSRP threshold determining module, adapted to determine a RSRP threshold; a RSRP detecting module, adapted to detect RSRPs of at least one large-cell base station; and a spectrum using mode determining module, adapted to compare the highest RSRP among the detected RSRPs with the determined RSRP threshold, adopt a separate spectrum mode if the highest RSRP is higher than the RSRP threshold, and otherwise adopt a shared spectrum mode.

An embodiment of the present invention also provides a base station, which includes: a RSRP detecting module, adapted to detect RSRPs of at least one large-cell base station; a connection module, adapted to determine a large-cell base station corresponding to the highest RSRP among the detected RSRPs and establish a connection with the determined large-cell base station; a RSRP reporting module, adapted to report the detected highest RSRP to the determined large-cell base station; a receiving module, adapted to receive from a large-cell base station a notification message carrying a spectrum using mode; and a spectrum using mode adjusting module, adapted to adjust the spectrum using mode according to the spectrum using mode carried in the received notification.

Another embodiment of the present invention provides a base station, which includes: a RSRP threshold determining module, adapted to determine a RSRP threshold; a RSRP receiving module, adapted to receive from a small-cell base station a RSRP of a large-cell base station; a spectrum using mode determining module, adapted to determine whether the RSRP received exceeds the RSRP threshold, determine to adopt a separate spectrum mode if the RSRP received exceeds the RSRP threshold, and otherwise determine to adopt a shared spectrum mode; and a spectrum using mode notifying module, adapted to notify the small-cell base station of the determined spectrum using mode.

Still another embodiment of the present invention provides a base station, which includes: a threshold receiving module, adapted to receive from a large-cell base station a RSRP threshold; a RSRP detecting module, adapted to detect RSRPs of at least one large-cell base station; a spectrum using mode determining module, adapted to determine whether the highest RSRP among the detected RSRPs exceeds the RSRP threshold received, adopt a separate spectrum mode if the highest received exceeds the RSRP threshold, and otherwise adopt a shared spectrum mode; and a spectrum using mode adjusting module, adapted to adjust the local spectrum using mode according to the determined spectrum using mode.

Yet another embodiment of the present invention provides a base station, which includes: a RSRP threshold determining module, adapted to determine a RSRP threshold; and a threshold transmitting module, adapted to transmit the determined RSRP threshold to a small-cell base station.

In accordance with the method of spectrum utilization in a wireless cellular environment with coverage of at least two wireless networks and the apparatus thereof, a proper spectrum using mode between two wireless networks is determined according to location information for indicating the distance between the small-cell base station and the large-cell base station, where, a separate spectrum mode is adopted when the distance is relatively short to decrease the interference between the small-cell base station and the large-cell base station, so that the utilization efficiency of the spectrum in the wireless cellular environment with coverage of at least two wireless networks is improved, and when the distance is relatively long, a shared spectrum mode is adopted to realized sharing spectrum, so that the utilization efficiency of the spectrum in the wireless cellular environment with coverage of at least two wireless networks is improved.

BRIEF DESCRIPTION OF THE DRAWINGS

In order to make those ordinarily skilled in the art understand the aforementioned and any other character and advantage of the present invention more clearly, demonstrative embodiments of the present invention is described in details referring to accompanying drawings hereinafter, and in the accompanying drawings.

DETAILED DESCRIPTION OF THE INVENTION

Figure 1:
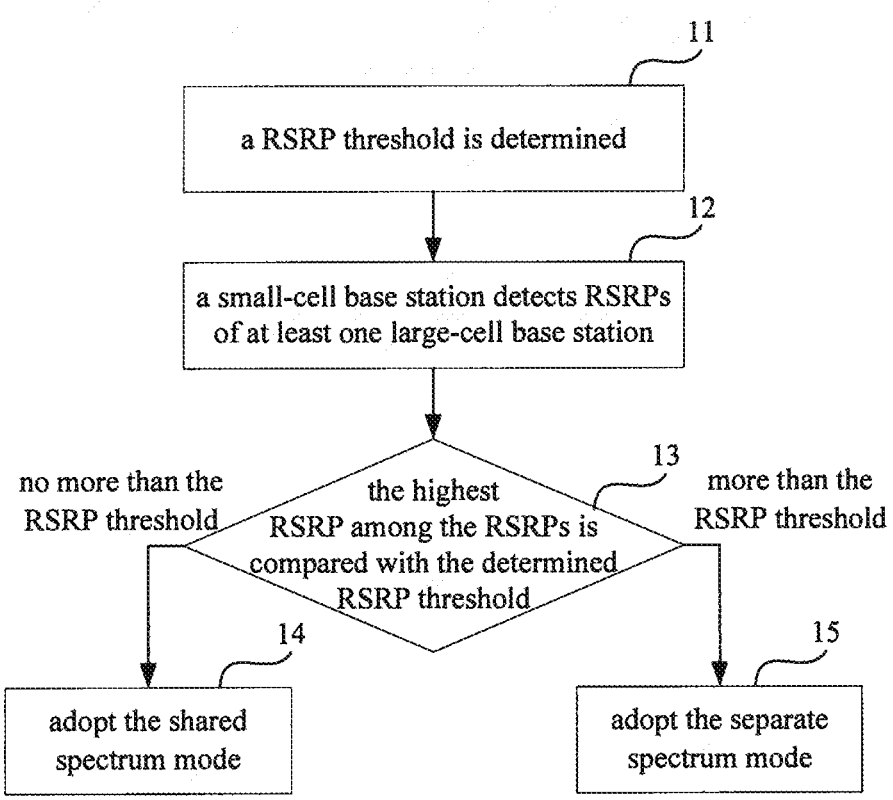
FIG. 1 is a flow chart of a method of spectrum utilization in a wireless cellular environment with coverage of at least two wireless networks in accordance with an embodiment of the present invention.

In order to make objects and technical solutions of the present invention more clear, the present invention is further described in detail referring to accompanying drawings and embodiments hereinafter.

Embodiments of the present invention provide a method of spectrum utilization in a wireless cellular environment with coverage of at least two wireless networks to improve the spectrum utilization efficiency of the wireless cellular environment with coverage of at least two wireless networks. The method includes: determining a spectrum using mode for a small-cell base station and a large-cell base station in two wireless networks according to the location information of the small-cell base station. In one embodiment, there are two types of spectrum using modes for the small-cell base station and the large-cell base station in two wireless networks, which includes: a shared spectrum mode in which the small-cell base station and the large-cell base station shares the same spectrum and a separate spectrum mode in which the small-cell base station and the large-cell base station uses different spectrums. Specifically, in the shared spectrum mode, the small-cell base station and the large-cell base station both can use all the available spectrum resources simultaneously, however, in the separate spectrum mode, the available spectrum resources are divided into two parts and the small-cell base station and the large-cell base station uses their respective part of spectrum resources allocated in advance. In embodiments of the present invention, the location information of the small-cell base station refers to the distance between the small-cell base station and its closest large-cell base station which may be evaluated according to the actual distance or the received power of a pilot signal, which is named as the Reference Signal Received Power (RSRP) hereinafter. To improve the spectrum utilization efficiency of the wireless cellular environment with coverage of at least two wireless networks, the small-cell base station may adopts the separate spectrum mode when being relatively close to the large-cell base station and adopts the shared spectrum mode when being relatively far from the large-cell base station.

In the present invention, for convenience of description, the wireless cell with a larger transmission radius in the wireless cellular environment with coverage of at least two wireless networks is called a large cell, and the wireless cell having a smaller transmission radius therein is called a small cell. For example, in a wireless cellular environment with overlapping coverage of a Macrocell and any of a Microcell, Picocell and Femtocell, the large cell refers to the Macrocell while the small cell refers to the Microcell, Picocell or Femtocell; in a wireless cellular environment with overlapping coverage of a Microcell and any of a Picocell and Femtocell, the large cell refers to the Microcell while the small cell refers to the Picocell or Femtocell; and, in a wireless cellular environment with overlapping coverage of a Picocell and a Femtocell, the large cell refers to the Picocell while the small cell refers to the Femtocell. Accordingly, the base station in the large cell is called a large-cell base station, e.g., the base station in the Macrocell, while the base station in the small cell is called a small-cell base station, e.g., a Home Node B (HNB) which supports Femtocell coverage in the 3GPP network, a Home eNodeB (HeNB) which supports Femtocell coverage in the 3GPP LTE network or etc., and the HNB and HeNB can be conveniently arranged at home or in office by users.

The principle and method for determining proper spectrum using modes for the small-cell base station and the large-cell base station in the two wireless networks according to the location information of the small-cell base station is further described in detail referring to the accompany drawings of the present invention hereinafter.

The small-cell base station and the large-cell base station can work in the shared spectrum mode or in the separate spectrum mode. However different working modes will introduce different effects to the network capacity of the small-cell and large-cell base stations. In embodiments of the present invention, the network capacity may be evaluated specifically by data throughputs.

Specifically, in the downlink, the HUE accessing the small-cell base station will always suffer a downlink interference from the large-cell base station, where, greater downlink interference is suffered by the HUE accessing the small-cell base station when the small-cell base station is closer to the large-cell base station, and in contrast, less downlink interference is suffered by the HUE accessing the small-cell base station when the small-cell base station is farther from the large-cell base station. Thus, supposing that the small-cell base station and the large-cell base station uses the shared spectrum mode, the downlink interference suffered by the HUE accessing the small-cell base station is greater when the small-cell station is closer to the closest large-cell base station, which results in a smaller Signal to Interference and Noise Ratio (SINR) of the small-cell base station, a lower spectrum efficiency and a lower system capacity of the small-cell base station. Sometimes, the system capacity will be even lower than the network capacity when the separate spectrum mode is used. And in contrast, it is known that the farther the small-cell station is from the closest large-cell base station, the greater the attenuation of the large-cell base station's signal is, and thus the less the downlink interference suffered by the HUE accessing the small-cell base station is. Further, the less the downlink interference suffered by the HUE accessing the small-cell base station is, the greater the SINR of the small-cell base station is, and thus the higher the spectrum efficiency and the system capacity of the small-cell base is. Sometimes, the system capacity will be even higher than the network capacity when the separate spectrum mode is used. That is to say, if the distance between the small-cell base station and large-cell base station reaches a certain value, i.e., when the distance exceeds such value, the network capacity in case that the small-cell base station and large-cell base station uses the shared spectrum mode may exceed the network capacity in case that they uses the separate spectrum mode. In another word, since the downlink interference to the HUE from the large-cell base station is relatively low, the network capacity can be increased if the small-cell base station and large-cell base station use the shared spectrum mode. However, when the distance is less than such value, the small-cell base station and large-cell base station should use the separate spectrum mode to guarantee the network capacity since the downlink interference to the HUE from the large-cell base station is relatively high. Therefore, in embodiments of the present invention, the distance between the small-cell base station and large-cell base station when the network capacity in case that the small-cell base station and large-cell base station uses the shared spectrum mode is equal to that in case that they uses the separate spectrum mode may be regarded as a division point for changing the spectrum using mode of the small-cell base station and large-cell base station in the downlink.

In the uplink, the large-cell base station will always suffer uplink interference from the HUE accessing the small-cell base station, where, the closer the small-cell base station is to the large-cell base station, the greater uplink interference the large-cell base station suffers from the HUE accessing the small-cell base station, and in contrast, the farther the small-cell base station is from the large-cell base station, the less the uplink interference the large-cell base station suffers from the HUE accessing the small-cell base station. Thus, supposing that the small-cell base station and the large-cell base station uses the shared spectrum mode, the uplink interference suffered by the large-cell base station from the HUE accessing the small-cell base station is relatively greater when the small-cell station is closer to the closest large-cell base station, which results in a lower capacity of the Macrocell base station, which will be even lower than the network capacity when the separate spectrum mode is used; and in contrast, the uplink interference suffered by the large-cell base station from the HUE accessing the small-cell base station is relatively less when the small-cell station is farther from the closest large-cell base station, and the spectrum efficiency and the system capacity of the small-cell base station is also higher. Sometimes, in this case, the system capacity will be even higher than the network capacity when the separate spectrum mode is in use. Therefore, similar to the downlink, the small-cell base station and large-cell base station is permitted to use the shared spectrum mode only when the distance between the small-cell base station and large-cell base station has reached a certain value according to embodiments of the present invention, and they will however use the separate spectrum mode when the distance between them is less than such value. And in the uplink, the distance between the small-cell base station and large-cell base station when the network capacity in case that the small-cell base station and large-cell base station uses the shared spectrum mode is equal to that in case that they uses the separate spectrum mode may also be regarded as a division point for changing the spectrum using mode of the small-cell base station and large-cell base station.

It should be noted that, in embodiments of the present invention, division points for changing the spectrum using mode may be determined for the downlink and the uplink respectively, or alternatively, one unified division point for changing the spectrum using mode may be determined for both the downlink and the uplink.

In an embodiment of the present invention, the aforementioned distance between the small-cell base station and large-cell base station may be the actual distance between them which may be determined by a positioning apparatus, e.g., a Global Positioning System (GPS). The above-mentioned division point for changing the spectrum using mode for the small-cell base station in fact corresponds to a certain distance threshold.

Preferably, considering effects in the wireless transmission environment such as a shadowing effect and etc., in another embodiment of the present invention, the distance between the small-cell base station and large-cell base station is evaluated by the small-cell base station via detecting the received power of the large-cell base station's reference signal or pilot signal. Thus, a function module adapted to detect the received power of the large-cell base station's reference signal is to be added to the small-cell base station. In this case, it is indicated that the small-cell base station is closer to the large-cell base station if the small-cell base station detects a higher received power of the large-cell base station's reference signal, and in contrast, it is indicated that the small-cell base station is farther from the large-cell base station if the small-cell base station detects a lower received power of the large-cell base station's reference signal. In this embodiment, the above-mentioned division point for changing the spectrum using mode for the small-cell base station in fact corresponds to a certain received power threshold of the reference signal.

FIG. 1 illustrates a flow chart of a method of spectrum utilization in a wireless cellular environment with coverage of at least two wireless networks in accordance with an embodiment of the present invention. The method is applicable to not only in downlink but also in uplink. As shown in FIG. 1, the spectrum using method mentioned in the embodiment may include the following steps:

In Step 11, a RSRP threshold is determined.

In Step 12, a small-cell base station detects RSRPs of at least one large-cell base station.

In Step 13, the highest RSRP among the RSRPs is compared with the determined RSRP threshold. If the highest RSRP is no more than the RSRP threshold, it shows that the small-cell base station is relatively far from the large-cell base station, and Step 14 is performed to adopt the shared spectrum mode. Otherwise, it shows that the small-cell base station is relatively close to the large-cell base station and Step 15 is performed to adopt the separate spectrum mode.

It should be noted that, in practical applications, separate RSRP thresholds may be determined for the downlink and uplink respectively, i.e., a downlink RSRP threshold and a uplink RSRP threshold are determined respectively; or alternatively, a common RSRP threshold may be determined for both the downlink and uplink, e.g., a determined downlink RSRP threshold can be directly regarded as a common RSRP threshold, or a determined uplink RSRP threshold can be directly regarded as a common RSRP threshold.

The method for determining the RSRP in accordance with the embodiment is described in detail referring to the accompany drawings hereinafter.

Figure 2:
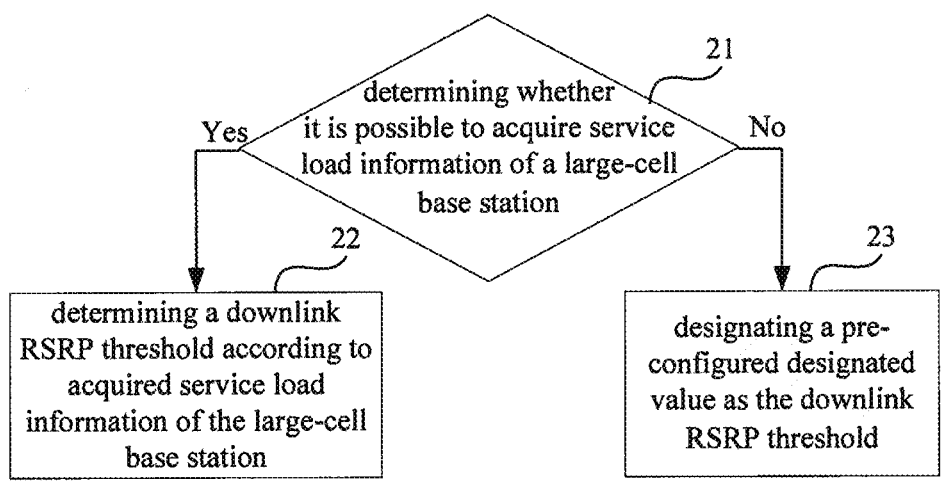
FIG. 2 is a flow chart for determining a threshold of a downlink Reference Signal Received Power (RSRP) in accordance with an embodiment of the present invention.

In practical applications, the downlink RSRP thresholds may be determined directly according to experiences. However, it may also be determined further according to service load information of the large-cell base station in case that it is possible to acquire the service load information because the downlink interference suffered by the HUE accessing the small-cell base station from the large-cell base station is also related to the large-cell base station's service load. Wherein, the service load information of the large-cell base station refers to a ratio of the spectrum resources which the large-cell base station actually occupies to support current services to all the available spectrum resources of the large-cell base station. Considering that if the service load of the large-cell base station is relatively light, the large-cell base station may have downlink interference to the user terminal HUE accessing the small-cell base station only on part of the spectrum resources, i.e., in this situation, the downlink interference to the user terminal HUE accessing the small-cell base station is less than that when the large-cell base station has a full load, the small-cell base station closer to the large-cell base station adopting the shared spectrum mode will be advantageous to the increase of the network capacity in case that the service load of the large-cell base station which is possible to be acquired, is relatively light. And in this case, the downlink RSRP threshold can be increased properly according to the current service load information of the large-cell base station. However, when the service load of the large-cell base station is relatively heavy, the small-cell base station relatively far from the large-cell base station may also suffer more interference, and in this case, the downlink RSRP threshold can be decreased properly according to the current service load information of the large-cell base station. FIG. 2 shows a flow chart for determining a downlink RSRP threshold in accordance with an embodiment of the present invention. As shown in FIG. 2, the method for determining a downlink RSRP threshold includes:

Step 21: Determining whether it is possible to acquire service load information of a large-cell base station, proceeding to Step 22 if it is possible to acquire the service load information of the large-cell base station, and otherwise, proceeding to Step 23.

Step 22: Determining a downlink RSRP threshold according to acquired service load information of the large-cell base station.

The method for determining the downlink RSRP threshold according to the acquired service load information of the large-cell base station as mentioned in this step includes: determining relationships between downlink data throughput and the RSRP in the shared spectrum mode and the separate spectrum mode respectively according to the service load information of the large-cell base station; calculating the RSRP when the large cell's downlink data throughput in the shared spectrum mode is equal to that in the separate spectrum mode; and using the calculated RSRP as the downlink RSRP threshold mentioned in this step.

Step 23: Designating a pre-configured designated value as the downlink RSRP threshold.

In the embodiment, the pre-configured designated value refers to a value of the downlink RSRP threshold which is determined when it is supposed that the to the small-cell base station suffers the most downlink interference from the large-cell base station, i.e., when the large-cell base station has a full load. Therefore, the pre-configured designated value is the large-cell base station's RSRP detected by the small-cell base station when the network capacity of the small-cell base station in the shared spectrum mode is equal to that in the separate spectrum mode under the circumstance that the large-cell base station has a full load. Herein, the network capacity of the large-cell base station is denoted by the downlink data throughput of the large-cell base station.

In the embodiment, the large-cell base station should perform steps of collecting and gathering statistics of its service load information to acquire the service load information of the large-cell base station. It can be seen from the above procedure for determining the RSRP threshold that the steps of collecting and gathering statistics of the service load information are optional in the embodiment.

Figure 3:
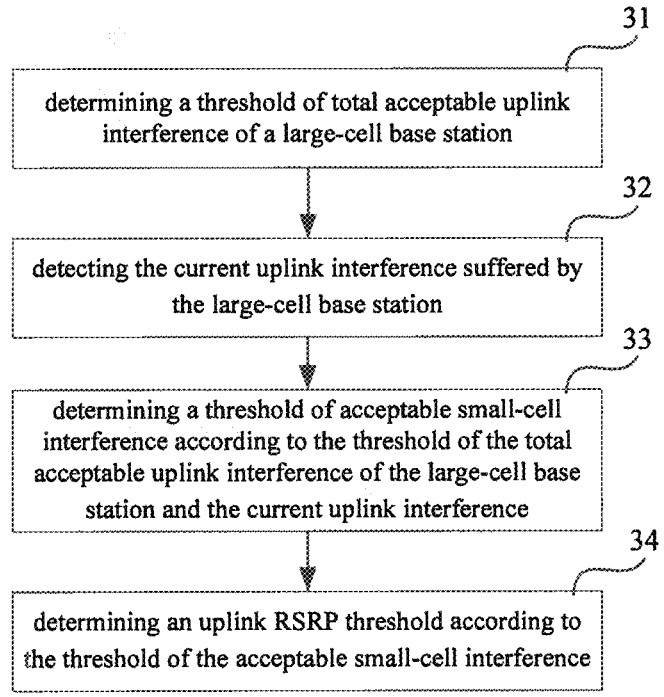
FIG. 3 is a flow chart for determining a threshold of an uplink RSRP in accordance with an embodiment of the present invention.

Regarding to the uplink RSRP threshold, the uplink interference to the large-cell base station from the HUE accessing the small-cell base station will be limited to a total acceptable uplink interference to the large-cell base station, therefore, it can be determined according to a threshold of the total acceptable uplink interference to the large-cell base station, the specific procedure of which is as shown in FIG. 3, mainly including:

Step 31: Determining a threshold of total acceptable uplink interference of a large-cell base station.

Wherein, the threshold of the total acceptable uplink interference of the large-cell base station is the total uplink interference suffered by the large-cell base station in the shared spectrum mode when the network capacity of the large-cell base station in the shared spectrum mode is equal to that in separate spectrum mode.

Step 32: Detecting the current uplink interference suffered by the large-cell base station.

Step 33: Determining a threshold of acceptable small-cell interference according to the threshold of the total acceptable uplink interference of the large-cell base station and the current uplink interference.

In one embodiment, the threshold of the acceptable small-cell interference is a value obtained by deducting the detected current uplink interference to the large-cell base station from the threshold of the total acceptable uplink interference to the large-cell base station.

Step 34: Determining an uplink RSRP threshold according to the threshold of the acceptable small-cell interference.

The uplink interference suffered by the large-cell base station from the HUE accessing the small-cell base station can be evaluated according to the RSRP of the large-cell base station detected by the small-cell base station; therefore, in turn the uplink RSRP threshold can be determined according to the threshold of the acceptable small-cell interference.

In a 3GPP network, the total uplink interference suffered by the large-cell base station is the sum of that from the UEs in the local large cell, that from the UEs in other adjacent large cells and that from all the UEs in small cells. In the 3GPP LTE network, the total uplink interference suffered by the large-cell base station may be measured by parameters of Interference over Thermal (IoT), and the IoT refers to the ratio of an interference power from all the UEs in other adjacent large cells and the small cells to a thermal noise power. Herein, the threshold of the total acceptable interference (total_IoT_threshold) of the large-cell base station is the maximum of the acceptable IoTs from all the UEs in other adjacent large cells and the small cells. The threshold of the acceptable small-cell interference is a value obtained by deducting the detected current uplink interference to the large-cell base station from the threshold of the total acceptable interference (total_IoT_threshold) of the large-cell base station. When there is only one small-cell base station in a large cell, the threshold of the total acceptable interference of the large-cell base station is the total uplink interference suffered by the large-cell base station in the shared spectrum mode when the small-cell base station is located at the division point for changing the spectrum using mode in the uplink.

Furthermore, since the total uplink interference suffered by the large-cell base station is also related to the service load of the large-cell base station, the uplink RSRP threshold may be dynamically adjusted further according to the current service load information of the large-cell base station in case that the service load information of the large-cell base station is acquirable, the specific method of which may refer to the aforementioned method for dynamically adjusting the downlink RSRP threshold according to current service load information of the large-cell base station.

In another embodiment of the present invention, the determined RSRP threshold can be decreased by a predetermined value, i.e., to increase a certain amount of margin, after determining the above RSRP threshold (the uplink RSRP threshold, the downlink RSRP threshold and the common RSRP threshold), in order to further decrease the interferences between the small-cell base station and the large-cell base station. Also the RSRP threshold in the uplink or downlink is needed to be decreased by a predetermined value to increase the certain amount of margin.

It should be noted that the spectrum using modes used in the uplink and downlink can be identical or different in embodiments of the present invention. For example, the shared spectrum mode or separate spectrum mode is used in both the downlink and the uplink; or alternatively, the shared spectrum mode is used in the downlink while the separate spectrum mode is used in the uplink, or on the contrary, the shared spectrum mode is used in the uplink while the separate spectrum mode is used in the downlink.

Figure 4:
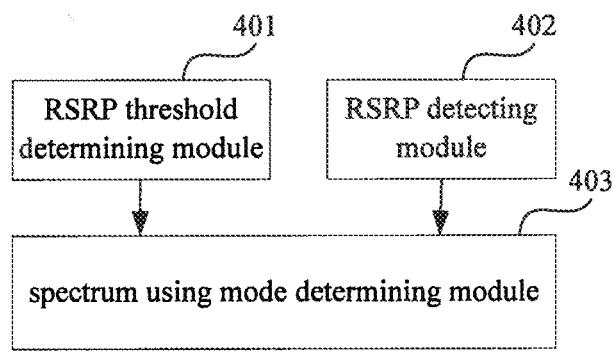
FIG. 4 is a diagram showing an inner structure of an apparatus for determining a spectrum using mode in accordance with an embodiment of the present invention.

Based on the aforementioned method of spectrum utilization in the wireless cellular environment with coverage of at least two wireless networks, an embodiment of the present invention also provides an apparatus for determining the spectrum using mode to implement this method. As shown in FIG. 4, the apparatus mainly includes:

a RSRP threshold determining module 41, adapted to determine a RSRP threshold;

a RSRP detecting module 42, adapted to detect RSRP of at least one large-cell base station; and a spectrum using mode determining module 43, adapted to compare the highest RSRP among the detected at least one RSRP with the determined RSRP threshold, determine to adopt a separate spectrum mode if the highest RSRP is higher than the RSRP threshold, and determine to adopt a shared spectrum mode otherwise.

The RSRP threshold determining module may determine the RSRP threshold according to the method shown in FIG. 2 or that shown in FIG. 3, or may alternatively determine the downlink RSRP threshold and uplink RSRP threshold separately according to their respective methods shown in FIGS. 2 and 3.

It should be noted that the method of spectrum utilization in the wireless cellular environment with coverage of at least two wireless networks as mentioned in the embodiments of the present invention needs to be accomplished by cooperation between the small-cell base station and the large-cell base station, therefore, the above-mentioned apparatus for determining the spectrum using mode is a logical apparatus in fact, and the modules therein may in located in different physical entities, e.g., respectively located in the large-cell base station and the small-cell base station, or located inside other network elements of the wireless networks.

The method of spectrum utilization in the above embodiments may be implemented by one of two methods of a centralized control method and a distributed control method according to different physical entities where the spectrum using mode determining module 43 is located in the apparatus for determining the spectrum using mode is located.

When the centralized control method is adopted, the RSRP threshold determining module 41 and the spectrum using mode determining module 43 are located in the large-cell base station or any other network element in the wireless networks, e.g., a serving gateway (S-GTW) in the 3GPP LTE network or etc., while the RSRP detecting module 42 is located in the small-cell base station. After the RSRP threshold determining module 41 which is located in the large-cell base station or any other network element determines the RSRP threshold, the spectrum using mode determining module 43 will further collect at least one large-cell base station's RERP detected by the RSRP detecting module 42 located in the small-cell base station, determine the spectrum using mode for the small-cell base station according to the collected RSRP and the determined RSRP threshold, and then further transmit the determined spectrum using mode to the corresponding small-cell base station. And the small-cell base station and the large-cell base station exchange bi-directional information directly via a wireless connection when the RSRP threshold determining module 41 and the spectrum using mode determining module 43 are located in the large-cell base station, while when the RSRP threshold determining module 41 and the spectrum using mode determining module 43 are located in any other network element, e.g., the S-GTW in the 3GPP LTE network, the exchanging of bi-directional information between the small-cell base station and the large-cell base station may be implemented via a cable connection between the small-cell base station and the network element and that between the large-cell base station and the network element.

When the distributed control method is adopted, the RSRP threshold determining module 41 is located in the large-cell base station or any other network element, e.g., the S-GTW in the 3GPP LTE or etc., while the RSRP detecting module 42 and the spectrum using mode determining module 43 are both located in the small-cell base station. The RSRP threshold determining module 41 located in the large-cell base station or any other network element transmits the determined RSRP threshold to the small-cell base station after making a determination on the RSRP threshold. The small-cell base station detects the large-cell base station's RSRP via the RSRP detecting module 42 after receiving the RSRP threshold, and then the small-cell base station's spectrum using mode is determined by the spectrum using mode determining module 43 according to the detected RSRP and the received RSRP threshold. The large-cell base station transmits to the small-cell base station information directly via a wireless connection when the RSRP threshold determining module 41 is located in the large-cell base station, while when the RSRP threshold determining module 41 is located in any other network element, the large-cell base station transmits to the network element the determined RSRP thresholds via a cable connection and the network element then transmits the received RSRP threshold to the small-cell base station via a cable connection.

Figure 5:
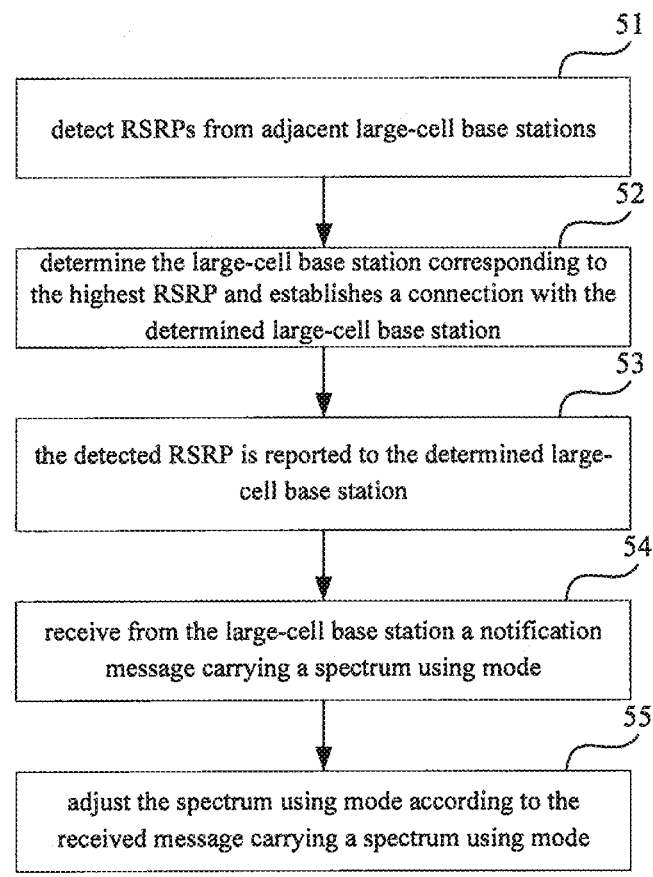
FIG. 5 is a flow chart of a small-cell base station in determining a spectrum using mode when a centralized control method is adopted in accordance with an embodiment of the present invention.
Figure 6:
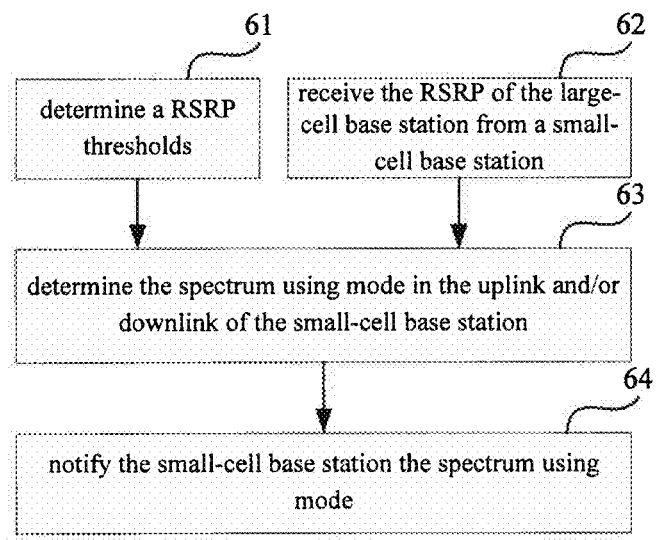
FIG. 6 is a flow chart of a large-cell base station in determining a spectrum using mode when a centralized control method is adopted in accordance with an embodiment of the present invention.

FIGS. 5 and 6 respectively show the flow charts of a small-cell base station and a large-cell base station determining the spectrum using mode when the centralized control method is adopted. In the embodiments shown in FIGS. 5 and 6, the RSRP is used to denote the distance between a small-cell base station and a large-cell base station, and the RSRP threshold determining module 41 and the spectrum using mode determining module 43 are supposed to be located in a large-cell base station.

As shown in FIG. 5, in Step 51, a small-cell base station detects the RSRP from the closest large-cell base station after power-on, which specifically includes: the RSRP detecting module 42 in the small-cell base station detects RSRPs from adjacent large-cell base stations, e.g., detects signal power of the Common Pilot Channel (CPICH) in the 3GPP network or RSRP in the 3GPP LTE network, where, if reference signals from multiple large-cell base stations are detected, in Step 52, it is needed to compare received powers of these signals to get the maximum among the received powers of these signals and the corresponding large-cell base station transmitting the strongest reference signals, and then regard this large-cell base station as the closest large-cell base station to the small-cell base station. And then, the small-cell base station determines the large-cell base station corresponding to the highest RSRP and establishes a connection with the determined large-cell base station. In Step 53, the detected RSRP is reported to the determined large-cell base station. The small-cell base station receives from the large-cell base station a notification message carrying a spectrum using mode in Step 54, and adjusts its spectrum using mode according to the received message carrying a spectrum using mode in Step 55. To implement the above procedure, the small-cell base station may further include: a connection module, adapted to determined the large-cell base station corresponding to the highest RSRP among the detected RSRPs and establish a connection with the determined large-cell base station; a RSRP reporting module, adapted to report to the large-cell base station the highest RSRP among the detected RSRPs; a receiving module, adapted to receive from the large-cell base station the notification message carrying a spectrum using mode; and a spectrum using mode adjusting module, adapted to adjust the spectrum using mode according to the received message carrying a spectrum using mode.

As shown in FIG. 6, in Step 61, the RSRP threshold determining module 41 located in a large-cell base station determines a uplink RSRP thresholds and/or a downlink RSRP threshold according to the procedure shown in FIG. 2 and/or FIG. 3, where, for the convenience of description, the uplink RSRP threshold, the downlink RSRP threshold and the common RSRP threshold in the uplink and downlink are called a RSRP threshold in unity in the present application. In Step 62, the RSRP of the large-cell base station is received from a small-cell base station, and then in Step 63, the spectrum using mode determining module 43 determines the spectrum using mode in the uplink and/or downlink of the small-cell base station according to the procedure shown in FIG. 1. At last, the small-cell base station is notified of its spectrum using mode in Step 64. Note that, the order Steps 61 and 62 are performed is not restrictively required, i.e., Step 61 can be performed first and then Step 62 is performed, or Step 62 is performed first while Step 61 is performed later, or Steps 61 and 62 are performed in parallel. To implement the above procedure, the large-cell base station may further include: a RSRP receiving module, adapted to receive from the small-cell base station the RSRP of the large-cell base station; and a spectrum using mode notifying module, adapted to notify the small-cell base station of the spectrum using mode.

When the large-cell base station determines the downlink RSRP threshold according to the procedure shown in FIG. 2 and the large-cell base station performs the step of collecting the large-cell base station's service load information and gathering statistics thereof, the large-cell base station may re-transmit a new notification message carrying a spectrum using mode to make the small-cell base station change its spectrum using mode if the change of the large-cell base station's downlink service loads results in the spectrum using mode determined for the small-cell base station having to be changed.

When the large-cell base station determines the uplink RSRP threshold according to the procedure shown in FIG. 3, the large-cell base station may also re-transmit a new notification message carrying a spectrum using mode to make the small-cell base station change its spectrum using mode if the change of the uplink interference from the large-cell base station results in the spectrum using mode determined for the small-cell base station having to be changed.

Figure 7:
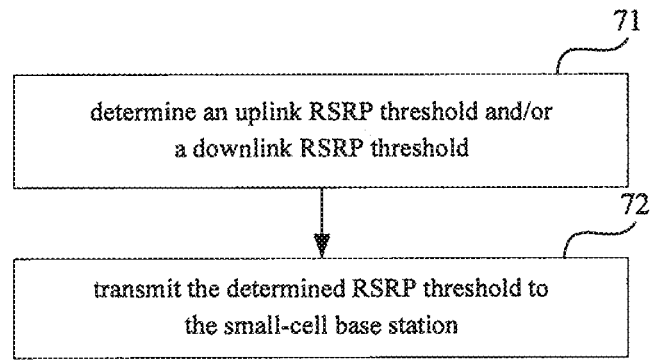
FIG. 7 is a flow chart of a large-cell base station in determining a spectrum using mode when a distributed control method is adopted in accordance with an embodiment of the present invention.
Figure 8:
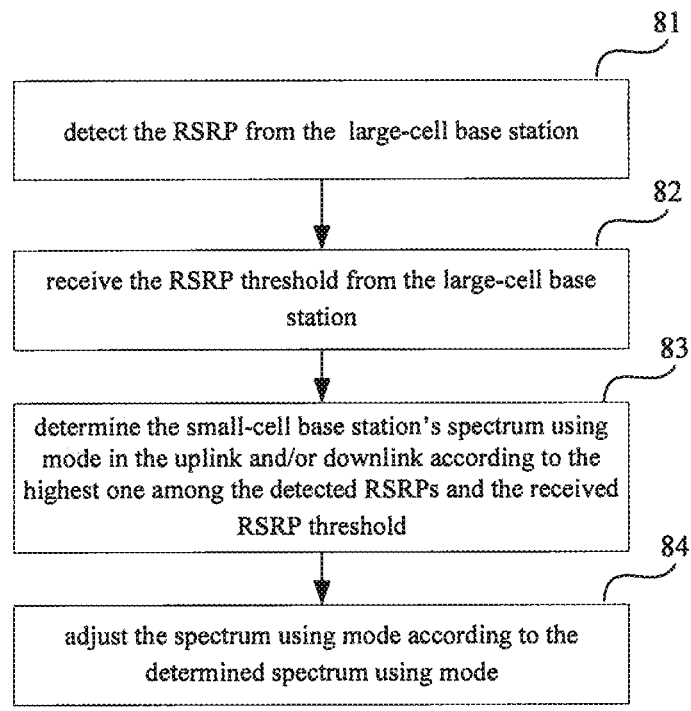
FIG. 8 is a flow chart of a small-cell base station in determining the spectrum using mode when a distributed control method is adopted in accordance with an embodiment of the present invention.

FIGS. 7 and 8 respectively show flow charts of a large-cell base station and a small-cell base station determining a spectrum using mode when a distributed control method is adopted. In the embodiments shown in FIGS. 7 and 8, the RSRP is used to denote the distance between a small-cell base station and a large-cell base station, and the RSRP threshold determining module 41, the RSRP detecting module 42 and the spectrum using mode determining module 43 are all supposed to be located in a small-cell base station.

As shown in FIG. 7, in Step 71, the RSRP threshold determining module 41 located in the large-cell base station determines an uplink RSRP threshold and/or a downlink RSRP threshold according to the procedure shown in FIG. 2 and/or FIG. 3, and in Step 72, the determined RSRP threshold is transmitted to the small-cell base station. To accomplish the above procedures, the large-cell base station may further include a threshold transmission module, adapted to transmit the determined RSRP threshold to the small-cell base station.

When the uplink RSRP threshold and/or the downlink RSRP threshold determined by the large-cell base station according to the procedure shown in FIG. 2 and/or FIG. 3 has changes, the large-cell base station may re-transmit to the small-cell base station a new RSRP threshold.

As shown in FIG. 8, in Step 81, a small-cell base station detects the RSRP from the closest large-cell base station after power-on, which specifically includes: the RSRP detecting module 42 in the small-cell base station detects the RSRPs from adjacent large-cell base stations, where, if pilot signals from multiple large-cell base stations are detected, it is needed to compare received powers of these signals to get the maximum among them and the corresponding large-cell base station transmitting the strongest reference signal, and then regard this large-cell base station as the closest large-cell base station to the small-cell base station. Then, in Step 82, small-cell base station receives the RSRP threshold from the large-cell base station. In Step 83, the spectrum using mode determining module 43 determines the small-cell base station's spectrum using mode in the uplink and/or downlink according to the highest one among the detected RSRPs and the received RSRP threshold by the procedure shown in FIG. 1. Finally, the small-cell base station adjusts its spectrum using mode according to the determined spectrum using mode in Step 84. To implement the above procedure, the small-cell base station may further include: a threshold receiving module, adapted to receive from the large-cell base station the RSRP threshold, and a spectrum using mode adjusting module, adapted to adjust the spectrum using mode according to the determined spectrum using mode.

It should be noted that if there are multiple small-cell base stations in the coverage area of the large-cell base station, the large-cell base station should work in the separated spectrum mode when one of the small-cell base stations adopts the separated spectrum mode. In addition, the spectrum using modes adopted in different sectors of the large-cell base station may be identical or different. That is to say, the aforementioned principle and method for determining the spectrum using mode as well as implementations may be applied to each sector of the large-cell base station. However, when a small-cell base station in one sector of the large-cell base station adopts the separated spectrum mode, the one sector of the large-cell base station should also work in the separated spectrum mode.

The highest transmission powers of small-cell base stations may also be regarded as one of the parameters for determining the downlink RSRP if it is permitted that the highest transmission powers of these small-cell base stations are different. That is, the highest transmission power of the small-cell base station to be judged should be used to evaluate the possible network capacity of the small-cell base station in different spectrum using modes when determining the downlink RSRP threshold.

The above embodiments of the present invention provide a method of spectrum utilization in a wireless cellular environment with the coverage of two wireless networks including the coverage of large cells and the coverage of small cells. Those skilled in this field can understand that the method may also be applicable to the environment with the coverage of more than two wireless networks. For example, Macrocells, Microcells, and cells smaller than Microcells can form coverage of three wireless networks. In an environment with the coverage of more than two wireless networks, the method and apparatus provided by the present invention can be adopted between each two adjacent wireless networks to implement spectrum utilization.

According to one embodiment of the method of the present invention, the proper spectrum using mode for the small-cell base station and large-cell base station can be determined according to the location information of the small-cell base station, the service load information in the large-cell network, and/or interference in the large-cell network with advantages of the two kinds of spectrum using mode, in order to increase the system's spectrum efficiency and make the total available spectrum resources in the two networks be allocated and used properly.

An emulation model in the 3GPP LTE network is given hereinafter, where the method of spectrum utilization in accordance with the embodiment of the present invention is emulated with parameters being assigned with certain values as shown in Table 1.

TABLE 1

| Parameter | Macrocell | Femtocell |
|---|---|---|
| Bandwidth | 20 MHZ (Shared Spectrum Mode) | 20 MHZ (Shared Spectrum Mode) |
|  | 15 MHZ (Separate Spectrum Mode) | 5 MHZ (Separate Spectrum Mode) |
| Network Layout | 19 Macrocells | 1 Femtocell |
|  | 3 sectors per Macrocell | 1 sector per Femtocell |
| Antenna Gain | 14 dBi | 4 dBi |
| Cell Radius | ISD (Inter-Site Distance) = 500 | 10 m |
| Transmission Power | 46 dBm | 24, 18, 12 dBm |
| Path Loss Model | $128.1 + 37.6\log_{10} d_{(km)}$ | $38 + 30\log_{10} d_{(m)}$ |
| Shadow Decline | 8 dB | 8 dB |
| Penetration Loss | 12 dB | 12 dB |
| UE power class | 24 dBm | 24 dBm |
| BS noise figure | 5 dB | 5 dB |
| UE noise figure | 9 dB | 9 dB |
| Thermal noise level | −174 dBm/Hz | −174 dBm/Hz |

In this example, a wireless cellular environment with coverage of two wireless networks includes a coverage of Macrocell and a coverage of Femtocell. The Macrocell's Inter-Site-Distance is 500 m and each cell's transmission radius is 10 m. Each Macrocell base station has three sectors and each sector covers ten well-distributed users. Each Femtocell base station has one sector and each small cell covers five well-distributed users.

The 3GPP LTE network adopts a technology of Orthogonal Frequency Division Multiplexing (OFDM), where each sub-carrier's bandwidth is 15 KHz, and each Resource Block (RB) has twelve sub-carriers. In the shared spectrum mode, the total available spectrum bandwidth is 20 MHz, while in the separate spectrum mode, the available spectrum bandwidth of the Macrocell is 15 MHz and the available spectrum bandwidth of the Femtocell is 5 MHz. a Round Robin mode is adopted in the Users' resource scheduling method. Suppose that the transmission power of the Macrocell base station is 46 dBm while the Femtocell base station's highest transmission power may be any of 24 dBm, 18 dBm and 12 dBm. Ten percent of the base station's total transmission power is taken as the transmission power of reference signals or pilot signals. There is one transmission antenna and two receiving antennas.

In the shared spectrum mode, there exists co-channel interference between the Macrocell base station and the Femtocell base station while there exists adjacent-channel interference between them in the separate spectrum mode. The Adjacent Channel Interference Ratio is 45 dB. In this example, the network capacity is evaluated by data throughout which is obtained by deducting thirty percent of signal overheads from statistic of data throughput.

Figure 9:
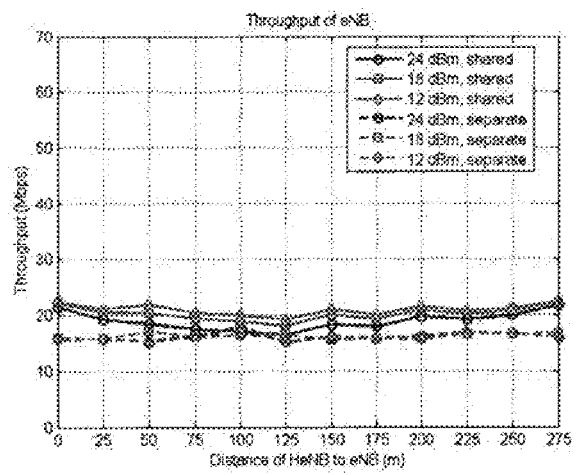
FIG. 9 is a graph showing a curve presenting the changes of the downlink data throughput of a Macrocell's sector where a small-cell base station is located with the distance between the small-cell base station and the Macrocell's base station.

FIG. 9 is a graph showing a curve presenting the changes of downlink data throughput of a Macrocell's sector where a Femtocell base station is located with the distance between the Femtocell base station and the Macrocell's base station. In FIG. 9, the horizontal axis denotes the distance between the Femtocell base station and the Macrocell base station while the vertical axis denotes the downlink data throughput of the Macrocell's sector where the Femtocell base station is located, where, a real line presents the downlink data throughputs of the Macrocell base station working in the shared spectrum mode, and dotted lines present the downlink data throughputs of the Macrocell base station working in the separate spectrum mode, the dotted lines referring to curves respectively with diamonds, blocks and circles which respectively correspond to the Femtocell base station's highest transmission powers of 24 dBm, 18 dBm and 12 dBm. It can be seen from FIG. 9 that data throughput of the Macrocell base station working in the shared spectrum mode exceeds that of the Macrocell base station working in the separate spectrum mode, and the data throughput of the Macrocell base station changes little along with the distance between the Femtocell base station and the Macrocell base station, because only few HUEs of the Macrocell base station adjacent to the Femtocell base station receive interference from the Femtocell base station.

Figure 10:
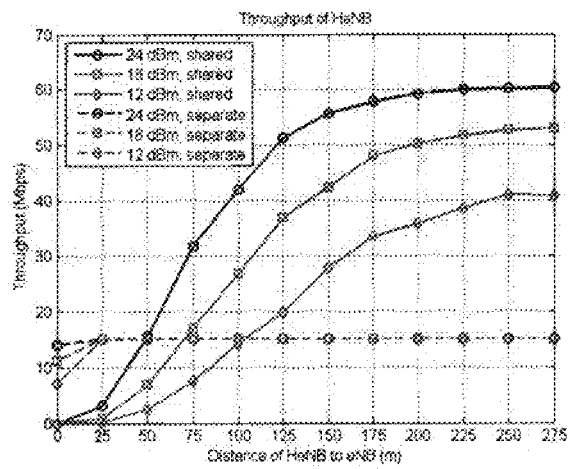
FIG. 10 is a graph showing a curve presenting respectively the changes of the downlink data throughputs of a small-cell base station when adopting a shared spectrum mode and when adopting a separate spectrum mode with the distance between the small-cell base station and a Macrocell base station.

FIG. 10 is a graph showing a curve presenting the changes of the downlink data throughputs of a Femtocell base station when adopting a shared spectrum mode and a separate spectrum mode with the distance between the Femtocell base station and a Macrocell base station. In FIG. 10, similar to FIG. 9, a real line presents the downlink data throughputs of the Femtocell base station working in the shared spectrum mode, and dotted lines present the downlink data thoughputs of the Femtocell base station working in the separate spectrum mode, the dotted lines referring to curves respectively with diamonds, blocks and circles which respectively correspond to the Femtocell base station's highest transmission powers of 24 dBm, 18 dBm and 12 dBm. As shown in FIG. 10, when the Femtocell base station is relatively close to the Macrocell base station, the data throughput of the Femtocell base station working in the separate spectrum mode exceeds that of the Femtocell base station working in the shared spectrum mode; and when the distance between the Femtocell base station and the Macrocell base station exceeds a certain distance value, the data throughput of the Femtocell base station working in the separate spectrum mode is less than that of the Femtocell base station working in the shared spectrum mode. When the network capacity of the Femtocell base station working in the shared spectrum mode is equal to that of the Femtocell base station working in the separate spectrum mode, the distance between the Femtocell base station and the Macrocell base station can be regarded as the distance division point for changing the Femtocell base station's spectrum using mode in the downlink. In the embodiments of the present invention, such distance can be regarded as a distance threshold, i.e., the distance division point for changing the Femtocell base station's spectrum using mode. The Femtocell base station adopts the shared spectrum mode when the distance between the Femtocell base station and the Macrocell base station exceeds the distance threshold and adopts the separate spectrum mode otherwise. For example, when the highest transmission powers of the Femtocell base station is 24 dBm, 18 dBm or 12 dBm respectively, the corresponding distance threshold is 50 m, 75 m or 100 m respectively. The distance division point corresponds to a certain RSRP threshold when the distance between the Femtocell base station and the Macrocell base station is evaluated by RSRP, and after calculation, the corresponding downlink RSRP threshold is −43.2 dBm, −49.8 dBm or −54.5 dBm respectively, when the highest transmission powers of the Femtocell base station is 24 dBm, 18 dBm or 12 dBm respectively.

In FIGS. 9 and 10, the downlink service load of the Macrocell base station is supposed to be full, i.e., 100%.

Figure 11:
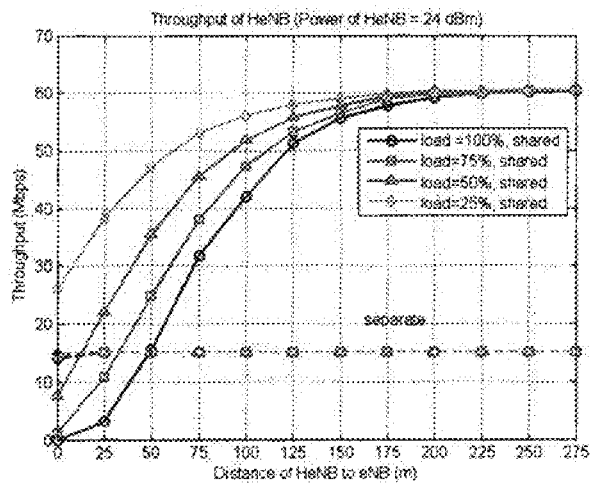
FIG. 11 is a graph showing a curve presenting respectively the changes of the downlink data throughputs of a small-cell base station with the distance between the small-cell base station and a Macrocell base station under different service loads of the Macrocell base station when the small-cell base station's highest transmission power is 24 dBm.

FIG. 11 is a graph showing a curve presenting the changes of the downlink data throughputs of a Femtocell base station with the distance between the Femtocell base station and the Macrocell base station under different service loads of a Macrocell base station (which are respectively 25%, 50%, 75% and 100%) when the Femtocell base station's highest transmission power is 24 dBm. In FIG. 11, a real line presents the downlink data throughputs of the Femtocell base station working in the shared spectrum mode, and dotted lines present the downlink data throughputs of the Femtocell base station working in the separate spectrum mode, the dotted lines referring to curves respectively with diamonds, triangles, blocks and circles which respectively correspond to the service loads of 25%, 50%, 75% and 100%. As shown in FIG. 11, the lighter the service load of the Macrocell base station is, the closer the distance threshold, i.e., the cross point of the real line and the dotted lines in FIG. 11, is to the Macrocell base station. That means that the Femtocell base station relatively close to the Macrocell base station may work in the shared spectrum mode. And the RSRP threshold becomes higher accordingly. When the service load is 25%, 50%, 75% or 100% respectively, the distance threshold is 50 m, 30 m, 15 m or 0 m respectively, and the corresponding downlink RSRP threshold is −43.2 dBm, −34.8 dBm, −23.5 dBm or an arbitrary value respectively.

Figure 12:
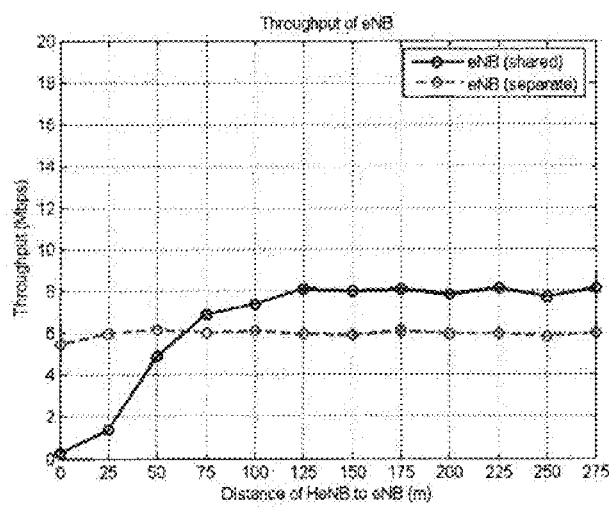
FIG. 12 is a graph showing a curve presenting the changes of the uplink data throughput of a Macrocell's sector where a small-cell base station is located with the distance between the small-cell base station and the Macrocell's base station.

FIG. 12 is a graph showing a curve presenting the changes of the uplink data throughput of a Macrocell's sector where a Femtocell base station is located with the distance between the Femtocell base station and the Macrocell's base station. In FIG. 12, a real line presents the uplink data throughputs in the shared spectrum mode, and dotted lines present the uplink data throughputs in the separate spectrum mode. As shown in FIG. 12, the data throughput of the Macrocell base station working in the separate spectrum mode exceeds that of the Macrocell base station working in the shared spectrum mode when the Femtocell base station is relatively close to the Macrocell base station; and when the distance between the Femtocell base station and the Macrocell base station exceeds a certain distance value, the data throughput of the Macrocell base station working in the shared spectrum mode exceeds the data throughput of the Macrocell base station working in the separate spectrum mode. When the network capacity of the Femtocell base station working in the shared spectrum mode is equal to that of the Femtocell base station working in the separate spectrum mode, the distance between the Femtocell base station and the Macrocell base station can be regarded as the distance division point for changing the Femtocell base station's spectrum using mode in the uplink. In the embodiments of the present invention, such distance can be regarded as a distance threshold, i.e., the distance division point for changing the spectrum using mode. The Femtocell base station adopts the shared spectrum mode when the distance between the Femtocell base station and the Macrocell base station exceeds the distance threshold and adopts the separate spectrum mode otherwise. As shown in FIG. 12, the distance division point for judging the uplink spectrum using mode is 60 m, and the corresponding uplink RSRP threshold is −46.2 dBm.

Figure 13:
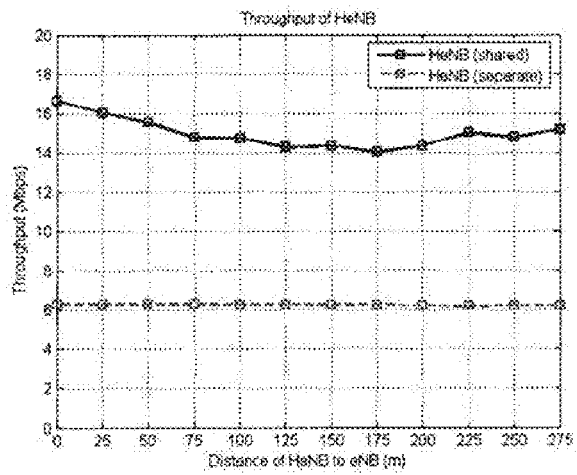
FIG. 13 is a graph showing a curve presenting the changes of the uplink data throughput of a small-cell base station with the distance between the small-cell base station and a Macrocell base station.

FIG. 13 is a graph showing a curve presenting the changes of the uplink data throughput of a Femtocell base station with the distance between the Femtocell base station and a Macrocell base station. In FIG. 13, a real line presents the uplink data throughputs in the shared spectrum mode, and dotted lines present the uplink data throughputs in the separate spectrum mode. As shown in FIG. 13, data throughput of the Femtocell base station working in the shared spectrum mode exceeds the data throughput of the Femtocell base station working in the separate spectrum mode, and the data throughput of the Femtocell base station changes little along with the distance between the Femtocell base station and the Macrocell base station, because only few HUE of the Macrocell base station adjacent to the Femtocell base station introduces interference to the Femtocell base station.

In FIGS. 12 and 13, the uplink service load of the Macrocell base station is supposed to be full, i.e., 100%.

Figure 14:
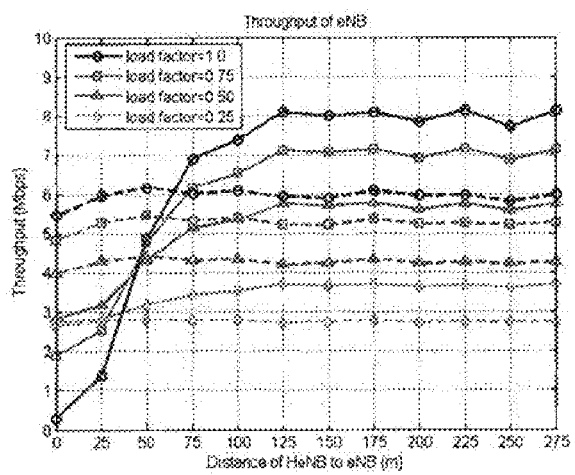
FIG. 14 is a graph showing a curve presenting respectively the changes of the data throughputs of a Macrocell base station with the distance between the small-cell base station and the Macrocell base station under different service loads of the Macrocell base station.

FIG. 14 is a graph showing a curve presenting the changes of the uplink data throughputs of a Macrocell base station with the distance between the Femtocell base station and the Macrocell base station under different service loads of the Macrocell base station. In FIG. 14, a real line presents the uplink data throughputs of the Macrocell base station working in the shared spectrum mode, and dotted lines present the uplink data throughputs of the Macrocell base station working in the separate spectrum mode, the dotted lines referring to curves respectively with diamonds, triangles, blocks and circles which respectively correspond to the service loads of 25%, 50%, 75% and 100%. As shown in FIG. 14, the lighter the service load of the Macrocell base station is, the closer the distance division point, i.e., the cross point of the real line and the dotted lines, is to the Macrocell base station. That means that the Femtocell base station relatively close to the Macrocell base station may work in the shared spectrum mode. At this time, the uplink RSRP threshold becomes higher accordingly. When the service load is 25%, 50%, 75% or 100% respectively, the corresponding distance division point is 60 m, 55 m, 50 m or 0 m respectively, and the corresponding uplink RSRP threshold is −46.2 dBm, −44.7 dBm, −43.2 dBm or an arbitrary value respectively.

Figure 15:
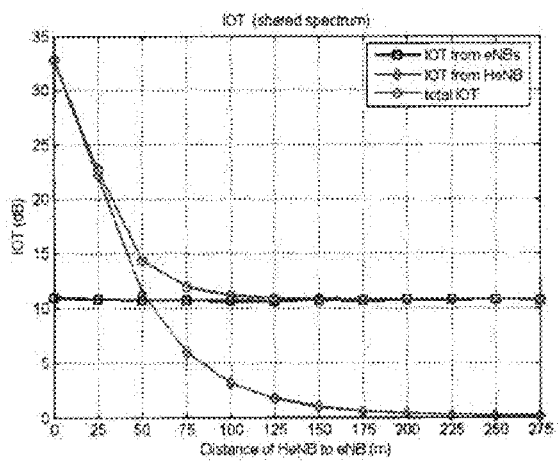
FIG. 15 is a graph showing a curve presenting the changes of the uplink interference received by a Macrocell base station when adopting a shared spectrum mode with the distance between a small-cell base station and the Macrocell base station.

FIG. 15 is a graph showing a curve presenting the changes of the uplink interference suffered by a Macrocell base station when adopting a shared spectrum mode with the distance between a Femtocell base station and the Macrocell base station, where, the uplink interference suffered from other Macrocell base stations is presented by a curve with blocks, the uplink interference suffered from the Femtocell base station is presented by a curves with diamonds, and the total interference suffered is presented by a curves with circles. In FIG. 15, the uplink service load of the Macrocell base station is full, i.e., 100%. The Macrocell base station suffers an uplink interference of 10.8 dB from adjacent Macrocell base stations. As shown in FIG. 15, the closer the Femtocell base station is to the Macrocell base station, the higher the uplink interference suffered by the Macrocell base station from the Femtocell base station is, and thus the higher the total uplink interference suffered by the Macrocell base station is. It can be seen from FIG. 15 that at the division point (60 m), i.e., the distance between the Macrocell base station and the Femtocell base station when the uplink interference suffered by the Macrocell base station from other Macrocell base stations is equal to that from the Femtocell base station, the uplink interference suffered by the Macrocell base station from the Femtocell base station is 7 dB and the total uplink interference suffered by the Macrocell base station is 12 dB which can be regarded as the total acceptable threshold, i.e., total_IoT_threshold. And in turn, the Macrocell base station can obtain an acceptable Femtocell threshold of 7 dB by deducting the Macrocell base station's current uplink interference which is measured as 10.8 dB from the total acceptable threshold configured, i.e., total_IoT_threshold. And then, it can be calculated that the uplink distance division point is 60 m and the corresponding RSRP threshold for judging the uplink spectrum using mode is −46.2 dBm according to the relationship between the uplink interference suffered by the Macrocell base station from the Femtocell base station and the distance between the Macrocell base station and the Femtocell base station.

The aforementioned is intended to show the preferred embodiments provided by the present invention, which should not be interpreted as limitations to the protection scope of the invention. Various modifications, equivalent substitute and improvement made by those skilled in this art without departing from the spirit and principle of the invention shall fall into the protection scope of the present invention.

The invention claimed is:

1. A method of spectrum utilization in a wireless cellular environment with coverage of at least two wireless networks, comprising:
    determining a reference signal received power (RSRP) threshold, the RSRP threshold being a division point for changing a small-cell base station's spectrum using mode, and the spectrum using mode comprises a shared spectrum mode and a separate spectrum mode, wherein the small-cell base station and a large-cell base station share a same spectrum when in the shared spectrum mode, and wherein available spectrum resources are divided into two parts and the small-cell base station and the large-cell base station use their respective part of spectrum resources allocated in advance when in the separate spectrum mode;
    detecting, by the small-cell base station, RSRPs of at least one large-cell base station; and comparing a highest one of the detected RSRPs with the determined RSRP threshold, adopting the separate spectrum mode if the highest one of the detected RSRP exceeds the determined RSRP threshold, and otherwise, adopting the shared spectrum mode; if the highest one of the detected RSRPs equals to the RSRP threshold, the small-cell base station has a same network capacity under the separate spectrum mode and the shared spectrum mode, wherein the RSRP threshold is an uplink RSRP threshold, and determining the RSRP threshold comprises: determining a threshold of a total acceptable uplink interference of a large-cell base station, detecting a current uplink interference to the large-cell base station, determining an acceptable small-cell interference threshold according to the threshold of the total acceptable uplink interference of the large-cell base station and the current uplink interference, and determining the uplink RSRP threshold according to the acceptable small-cell interference threshold.

2. The method of claim 1, wherein the threshold of the total acceptable uplink interference of the large-cell base station is a total uplink interference suffered by the large-cell base station in the shared spectrum mode when the network capacity of the large-cell base station in the shared spectrum mode is equal to that in the separate spectrum mode.

3. The method of claim 1, wherein determining the acceptable small-cell interference threshold according to the threshold of the total acceptable uplink interference of the large-cell base station and the current uplink interference comprises: deducting the current uplink interference to the large-cell base station from the threshold of the total acceptable uplink interference of the large-cell base station; and using the difference as the acceptable small-cell interference threshold.

4. The method of claim 1, further comprising:
determining the uplink RSRP threshold according to service load information of the large-cell base station if the service load information of the large-cell base station can be acquired.

5. The method of claim 4, wherein determining the uplink RSRP threshold according to service load information of the large-cell base station comprises:
determining relationships between large-cell uplink data throughput and the RSRP in the shared spectrum mode and the separate spectrum mode respectively according to the acquired service load information of the large-cell base station;
calculating the RSRP when the large-cell uplink data throughput in the shared spectrum mode is equal to that in the separate spectrum mode; and
using the calculated RSRP as the uplink RSRP threshold.

6. An apparatus for determining a spectrum using mode in a wireless cellular environment with coverage of at least two wireless networks, comprising: a RSRP threshold determining module to determine a RSRP threshold, the RSRP threshold being a division point for changing a small-cell base station's spectrum using mode, and the spectrum using mode comprises a shared spectrum mode and a separate spectrum mode, wherein the small-cell base station and a large-cell base station share a same spectrum when in the shared spectrum mode, and wherein available spectrum resources are divided into two parts and the small-cell base station and the large-cell base station use their respective part of spectrum resources allocated in advance when in the separate spectrum mode, wherein the RSRP threshold is an uplink RSRP threshold and the RSRP threshold determining module is further adapted to: determine a threshold of a total acceptable uplink interference of a large-cell base station, detect a current uplink interference to the large-cell base station, determine an acceptable small-cell interference threshold according to the threshold of the total acceptable uplink interference of the large-cell base station and the current uplink interference, and determine the uplink RSRP threshold according to the acceptable small-cell interference threshold;
a RSRP detecting module to detect RSRPs of at least one large-cell base station; and
a spectrum using mode determining module to compare a highest RSRP among the detected RSRPs with the determined RSRP threshold, adopt the separate spectrum mode if the highest RSRP is higher than the RSRP threshold, and otherwise adopt the shared spectrum mode, wherein if the highest RSRP among the detected RSRPs equals the RSRP threshold, the small-cell base station has a same network capacity under the separate spectrum mode and the shared spectrum mode.

7. A small-cell base station, in a wireless cellular environment with coverage of at least two wireless networks, comprising:
a reference signal received power (RSRP) detecting module to detect RSRPs of at least one large-cell base station;
a connection module to determine a large-cell base station corresponding to a highest RSRP among the detected RSRPs and establish a connection with the determined large-cell base station;
a RSRP reporting module to report the detected highest RSRP to the determined large-cell base station, wherein the large-cell base station compares the highest RSRP with a RSRP threshold, determines a separate spectrum mode when the highest RSRP is higher than the RSRP threshold, determines a shared spectrum mode when the highest RSRP is lower than the RSRP threshold, wherein the RSRP threshold being a division point for changing the small-cell base station's spectrum using mode, and the spectrum using mode comprises the shared spectrum mode and the separate spectrum mode, wherein the small-cell base station and the large-cell base station share a same spectrum when in the shared spectrum mode, wherein available spectrum resources are divided into two parts and the small-cell base station and the large-cell base station use their respective part of spectrum resources allocated in advance when in the separate spectrum mode, and wherein if the highest RSRP equals the RSRP threshold, the small-cell base station has a network capacity under the separate spectrum mode and the shared spectrum mode, wherein the RSRP threshold is an uplink RSRP threshold and the uplink RSRP threshold is determined by: determining a threshold of a total acceptable uplink interference of a large-cell base station, detecting a current uplink interference to the large-cell base station, determining an acceptable small-cell interference threshold according to the threshold of the total acceptable uplink interference of the large-cell base station and the current uplink interference, and determining the uplink RSRP threshold according to the acceptable small-cell interference threshold;
a receiving module to receive from the large-cell base station a notification message carrying the spectrum using mode determined by the large-cell base station; and a spectrum using mode adjusting module to adjust the spectrum using mode of the small-cell base station according to the spectrum using mode carried in the received notification.

8. A base station in a wireless cellular environment with coverage of at least two wireless networks, comprising:
- a reference signal received power (RSRP) threshold determining module to determine a RSRP threshold, the RSRP threshold being a division point for changing a small-cell base station's spectrum using mode, and the spectrum using mode comprises a shared spectrum mode and a separate spectrum mode, wherein the small-cell base station and a large-cell base station share a same spectrum when in the shared spectrum mode, and wherein available spectrum resources are divided into two parts and the small-cell base station and the large-cell base station use their respective part of spectrum resources allocated in advance when in the separate spectrum mode, wherein the RSRP threshold is an uplink RSRP threshold and the RSRP threshold determining module is further adapted to: determine a threshold of a total acceptable uplink interference of a large-cell base station, detect a current uplink interference to the large-cell base station, determine an acceptable small-cell interference threshold according to the threshold of the total acceptable uplink interference of the large-cell base station and the current uplink interference, and determine the uplink RSRP threshold according to the acceptable small-cell interference threshold;
- a RSRP receiving module to receive from a small-cell base station a RSRP of a large-cell base station, wherein if the RSRP of the large-cell base station equals the RSRP threshold, the small-cell base station has a same network capacity under the separate spectrum mode and the shared spectrum mode;
- a spectrum using mode determining module to determine whether the RSRP received exceeds the RSRP threshold, determine to adopt the separate spectrum mode if the RSRP received exceeds the RSRP threshold, and otherwise determine to adopt the shared spectrum mode; and
- a spectrum using mode notifying module to notify the small-cell base station of the determined spectrum using mode.

9. A small-cell base station in a wireless cellular environment with coverage of at least two wireless networks, comprising:
- a threshold receiving module to receive from a large-cell base station a reference signal received power (RSRP) threshold, the RSRP threshold being a division point for changing the small-cell base station's spectrum using mode, and the spectrum using mode comprises a shared spectrum mode and a separate spectrum mode, wherein the small-cell base station and the large-cell base station share a same spectrum when in the shared spectrum mode, and wherein available spectrum resources are divided into two parts and the small-cell base station and the large-cell base station use their respective part of spectrum resources allocated in advance when in the separate spectrum mode, wherein the RSRP threshold is an uplink RSRP threshold and the uplink RSRP threshold is determined by: determining a threshold of a total acceptable uplink interference of a large-cell base station, detecting a current uplink interference to the large-cell base station, determining an acceptable small-cell interference threshold according to the threshold of the total acceptable uplink interference of the large-cell base station and the current uplink interference, and determining the uplink RSRP threshold according to the acceptable small-cell interference threshold;
- a RSRP detecting module to detect RSRPs of at least one large-cell base station, wherein if a highest one of the detected RSRPs equals the RSRP threshold, the small-cell base station has a same network capacity under the separate spectrum mode and the shared spectrum mode; and
- a spectrum using mode determining module to determine whether the highest RSRP among the detected RSRPs exceeds the RSRP threshold received, adopt the separate spectrum mode if the highest RSRP exceeds the RSRP threshold, and otherwise adopt the shared spectrum mode; and
- a spectrum using mode adjusting module to adjust the spectrum using mode of the small-cell base station according to the determined spectrum using mode.

10. A base station in a wireless cellular environment with coverage of at least two wireless networks, comprising:
- a reference signal received power (RSRP) threshold determining module to determine a RSRP threshold, the RSRP threshold being a division point for changing a small-cell base station's spectrum using mode, and the spectrum using mode comprises a shared spectrum mode and a separate spectrum mode, wherein the small-cell base station and a large-cell base station share a same spectrum when in the shared spectrum mode, and wherein available spectrum resources are divided into two parts and the small-cell base station and the large-cell base station use their respective part of spectrum resources allocated in advance when in the separate spectrum mode; and
- a threshold transmitting module to transmit the determined RSRP threshold to a small-cell base station, wherein the small-cell base station determines whether a highest RSRP among RSRPs of at least one large-cell base station detected by the small-cell base station exceeds the RSRP threshold, adopts the separate spectrum mode when the highest RSRP exceeds the RSRP threshold, and adopts the shared spectrum mode when the highest RSRP does not exceed the RSRP threshold, wherein if the highest one of the detected RSRPs equals the RSRP threshold, the small-cell base station has a same network capacity under the separate spectrum mode and the shared spectrum mode;

wherein the RSRP threshold is an uplink RSRP threshold and the RSRP threshold determining module is further adapted to:
determine a threshold of a total acceptable uplink interference of a large-cell base station,
detect a current uplink interference to the large-cell base station,
determine an acceptable small-cell interference threshold according to the threshold of the total acceptable uplink interference of the large-cell base station and the current uplink interference, and
determine the uplink RSRP threshold according to the acceptable small-cell interference threshold.

* * * * *